3,737,513
RECOVERY OF URANIUM FROM AN ORGANIC EXTRACTANT BY BACK EXTRACTION WITH $H_3PO_4$ OR HF
Tadeusz Karol Wiewiorowski, New Orleans, and David James Miller, Gretna, La., assignors to Freeport Minerals Company, New York, N.Y.
Filed July 2, 1970, Ser. No. 51,947
Int. Cl. B01d 11/00; C01g 56/00
U.S. Cl. 423—8     8 Claims

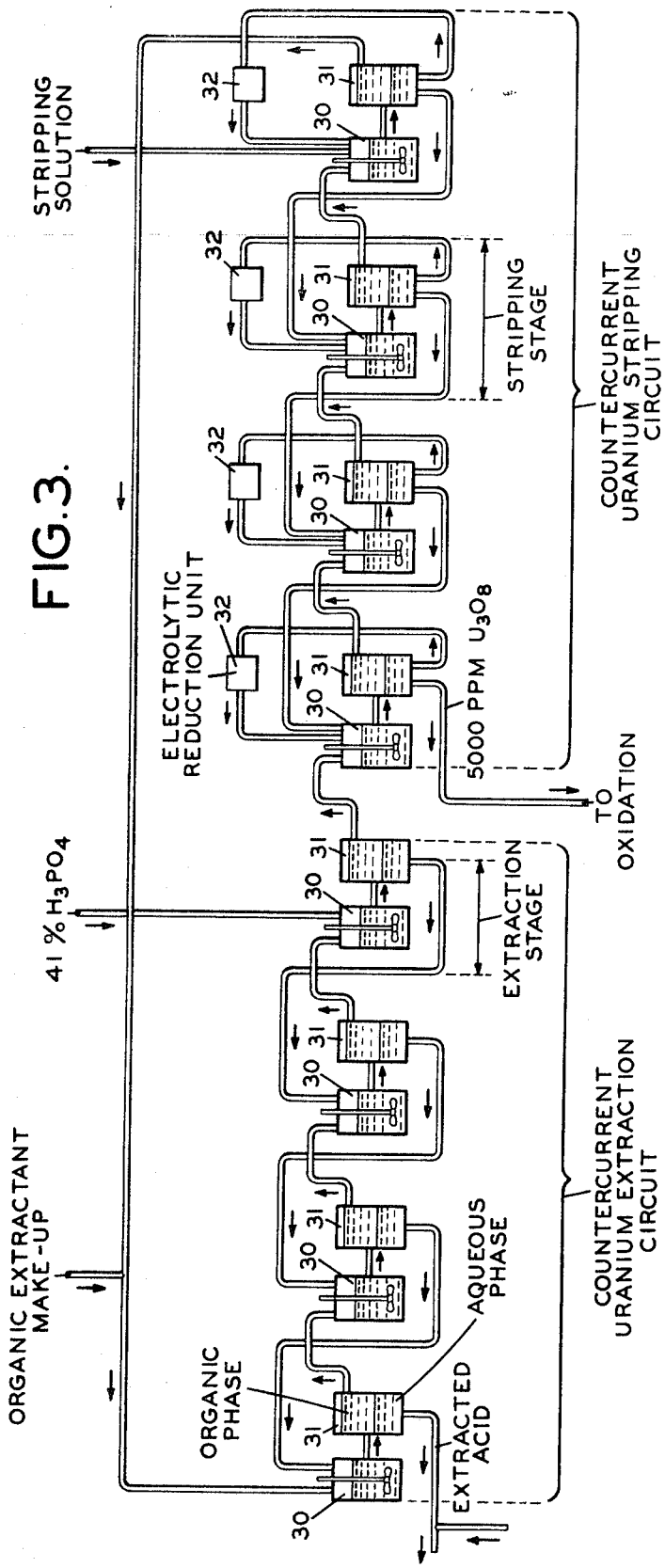
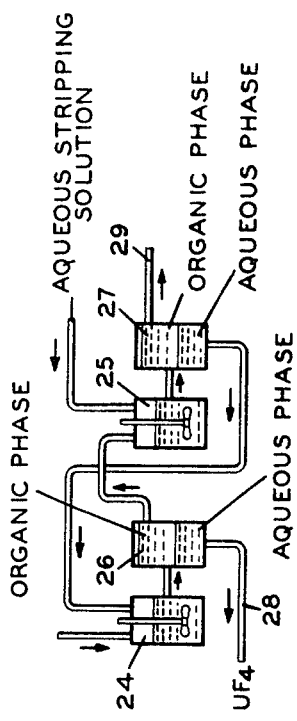

ABSTRACT OF THE DISCLOSURE

A process for the recovery of uranium values from uranium carrying extractants containing a dialkylphosphoric acid and a trialkylphosphine oxide dissolved in an organic solvent is described. The process involves liquid-liquid extraction of the extractants with an aqueous solution containing divalent iron and a complexing agent which may be either phosphoric acid, hydrofluoric acid or mixtures thereof.

BACKGROUND OF THE INVENTION

(1) Field of the art

This invention relates to the recovery of uranium values from organic extractants used in solvent extraction processes.

(2) Description of the prior art

Phosphate rock can contain from 100 to 400 parts per million (p.p.m.) by weight of uranium (expressed as $U_3O_8$), depending on its type and origin. A major portion of this uranium becomes solubilized during the acidulation of phosphate rock and ends up as a component of the phosphoric acid. It is estimated that at the present time, over 4 million pounds of uranium per year are so processed in the United States without being recovered. Organic extractants capable of removing the uranium from the phosphoric acid are presently available. The recovery of uranium values from such organic extractants is an essential step in any overall system for uranium recovery from phosphoric acid by solvent extraction.

The presence of uranium in phosphate rock and in phosphoric acid has been recognized for many years. Consequently, a process as described in "Uranium Recovery From Wet Process Phosphoric Acid" by B. F. Greek, O. W. Allen, and Donald E. Tynan, Industrial and Engineering Chemistry, vol. 49, No. 4, page 608 (1957), was developed and utilized for the recovery of uranium from phosphoric acid produced by treatment of Florida phosphate rock with sulfuric acid. The commercial application of this process was short-lived, however, due primarily to the technical and economic disadvantages which made uranium recovery by this process unattractive as compared to direct uranium production from uranium ores. The major disadvantages of this process included the chemically unstable nature of the extracting reagent, the poor phase separation in the solvent extraction circuit and the expensive pretreatement of the phosphoric acid requiring the use of elemental iron.

Recognizing the disadvantages of prior art, a research team at the Oak Ridge National Laboratory developed a new solvent extraction system which does not suffer from the shortcomings referred to above. In this system as reported in "Solvent Extraction of Uranium From Wet-Process Phosphoric Acid, by F. J. Hunt, D. J. Crouse, and K. B. Brown, Oak Ridge National Laboratory, Technical Manuscript 2522, April 1969, the uranium was extracted from phosphoric acid with an organic solution containing a dialkylphosphoric acid and a trialkylphosphine oxide. The uranium-containing organic solution was then subjected to a washing step to remove phosphoric acid and to a stripping step, utilizing an aqueous ammonium hydroxide-ammonium carbonate stripping solution, to concentrate and recover the uranium values. In the stripping operation, the uranium values were transferred from the organic to the aqueous phase. Since the organic solution contained a dialkylphosphoric acid, ammonia values were absorbed into the organic phase from the stripping solution to form the corresponding ammonium salt of this acid. After the stripping operation, the ammonia-carrying organic solvent was returned to the uranium extraction circuit for contact with fresh phosphoric acid. The absorption of the ammonia values by the phosphoric acid resulted in ammonia losses and in undesirable contamination of the phosphoric acid.

This new system had certain other distinct disadvantages, namely high ammonia consumption costs resulting from the selection of an aqueous ammonium hydroxide-ammonium carbonate stripping solution, and phosphoric acid losses encountered in the washing step of the solvent extraction circuit.

THE INVENTION

It is an object of this invention to provide a new, convenient, and useful process for recovering uranium values from an organic extractant containing a dialkylphosphoric acid and a trialkylphosphine oxide.

It is another object of this invention to provide a new and useful process for recovering uranium values from organic extractants containing a dialkylphosporic acid and a trialkylphosphine oxide which employs an acidic aqueous stripping solution, rather than an alkaline stripping solution.

It is a further object of this invention to eliminate disadvantages of prior art solvent extraction systems for recovering uranium values from phosphate rock and from phosphoric acid.

It is another object of this invention to provide a new and useful process of obtaining uranium values from organic extractants containing a dialkylphosphoric acid and a trialkylphosphine oxide in which process the dialkylphosphoric acid does not become neutralized to form a salt, but is retained in its free-acid form.

It is a further object of this invention to provide a new and useful process of obtaining uranium values from organic extractants which can be incorporated into an overall solvent extraction scheme for uranium recovery from phosphoric acid.

A further object of this invention is to provide a new and useful process of obtaining uranium values from an organic extractant containing a dialkylphosphoric acid and a trialkylphosphine oxide dissolved in an organic solvent.

We have found that uranium values can be obtained from an organic extractant containing a dialkylphosphoric acid and a trialkylphosphine oxide by using an acidic aqueous stripping (removal) solution, containing:

(1) a dissolved divalent iron salt, and
(2) a complexing agent selected from the group consisting of phosphoric acid, hydrofluoric acid and mixtures thereof.

In the process of this invention any dialkylphosphoric acid and trialkylphosphine oxide can be employed. The ratio employed of the two compounds is not critical. Illustrative of such compounds are dihexylphosphoric acid, dioctylphosphoric acid, didecylphosphoric acid, tributylphosphine oxide, trihexylphosphine oxide and tridecylphosphine oxide. In the process any divalent iron salt capable of dissolving in the aqueous stripping solution can be used. These include ferrous sulfate $FeSO_4$, ferrous chloride $FeCl_2$, ferrous bromide $FeBr_2$, ferrous nitrate $Fe(NO_3)_2$, and ferrous phosphate $Fe_3(PO_4)_2$. The solvent for the organic extractant can be any organic solvent provided that its boiling point is above the temperature used in the process. Illustrative organic solvents include kerosene, toluene, p-xylene, o-xylene and ethyl benzene.

Details of the chemical mechanism by which the divalent iron and the complexing agent effect the uranium transfer from the organic to the aqueous phase have not been established. It is believed, however, that the synergistic effectivness of the divalent iron-complexing agent combination involves the reduction of uranium values from the +6 to the +4 valency state and the complexing of the reduced uranium by the phosphoric or hydrofluoric acid present in the stripping solution.

Stripping of uranium values from the uranium containing organic extractant in the presence of the acidic aqueous solution can be accomplished using any type of equipment suitable for liquid-liquid extraction. Commonly known multi-stage "countercurrent" mixer-settler apparatuses are especially suitable. The term "countercurrent" denotes that the two phases present during the process, viz, the organic and aqueous phases, move in opposing directions. When using a multi-stage "countercurrent" mixer-settler apparatus the two phases within each stage are normally subjected to a vigorous mixing in the mixer and then allowed to separate in the settler. After separation, each phase is transferred by mechanical means in opposing directions.

The stripping operation of the invention is normally conducted at atmospheric pressure although the stripping could be carried out at pressures other than atmospheric. Changes in the pressure during the stripping operation have little effect on the chemistry and the effectiveness of the overall stripping operation. Minimum pressure selected should be such as to exceed the boiling point requirements of the organic extractant and of the aqueous stripping solution.

It is preferred that the concentration of divalent iron in the stripping solution be between about 1 and about 100 grams per liter of solution. In operating the process, it was found desirable, although not necessary, to continuously subject the stripping solution after it leaves the stripping unit to an electrolytic reduction. It is believed that as the uranium is reduced from the +6 to the +4 oxidation state the divalent iron becomes oxidized to the trivalent form. The electrolytic reduction is believed to reduce the trivalent iron back to the divalent form thereby economizing on the divalent iron salt requirement. Also, although not essential to the invention, the pregnant aqueous stripping solution which leaves the stripping unit can be thereafter subjected to oxidation and the uranium value recovered from this solution utilizing a small side stream of the organic extractant. Any oxidizing agents for this oxidation can be used. These include sodium chlorate, hydrogen peroxide, air, oxygen, nitric acid and chlorine. The oxidation can be carried out at ambient temperature or at elevated temperatures. In case a gas is used as the oxidant (air, oxygen or chlorine) the oxidation may be carried out at elevated pressure. It is believed that the oxidation converts the uranium content to the +6 valency state.

For effecting the electrolytic reduction, the stripping solution from a given stage of the mixer-settler apparatus is introduced into a conventional steel cathode compartment of the electrolytic cell which cell also contains a carbon anode compartment, the compartments being separated by a porous membrane. A source of direct current capable of supplying about 5 volts DC is used. The following reaction is believed to take place at the cathode:

$$Fe^{+3} + (e) \rightarrow Fe^{+2}$$

The concentration of trivalent iron in the stripping solution is thus decreased, with a corresponding increase in the concentration of divalent iron. The electrolytically reduced stripping solution is then returned to the same stage of the mixer-settler apparatus from which it was withdrawn.

The concentration of phosphoric acid in the starting stripping solution is generally between about 30 and 85% $H_3PO_4$ by weight of stripping solution and preferably between about 40 and about 55% $H_3PO_4$ by weight. A 30% $H_3PO_4$ is considered a relatively dilute phosphoric acid; a 85% $H_3PO_4$ is considered a strong, concentrated phosphoric acid.

When hydrofluoric acid, rather than phosphoric acid, is used in the stripping solution, its concentration should be between about 8 and about 40% HF, and preferably between about 12 and about 25% HF by weight of stripping solution. An 8% HF is considered a dilute hydrofluoric acid, a 40% is considered a concentrated hydrofluoric acid.

The selection of acid concentrations is based primarily on economic considerations. For example, operation below 7% HF is economically unattractive because of poor uranium recoveries, while operation about 40% HF is economically unattractive because of high HF losses.

In practicing this invention, the uranium content of the extractant prior to stripping is generally between about 150 and about 20,000 parts per million by weight, expressed as $U_3O_8$, and preferably between about 300 and about 1000 parts per million by weight. After stripping, the uranium content of the organic extractant is generally between zero and about 100 p.p.m. by weight expressed as $U_3O_8$ and preferably between zero and about 25 p.p.m. expressed as $U_3O_8$, by weight. After contact with the organic extractant, the uranium content of the aqueous stripping solution containing phosphoric acid as the complexing component will be primarily a function of the initial uranium content of the organic extractant and of the volumetric phase ratio of organic to aqueous solutions subjected to liquid-liquid contact.

Operating conditions for the stripping process are generally selected in such a manner so as to yield a uranium concentration of about 1,000 to about 20,000 p.p.m. expressed as $U_3O_8$ and preferably about 5,000 to about 15,000 p.p.m. $U_3O_8$ by weight. In these concentration ranges, the uranium remains dissolved in the stripping solution when phosphoric acid is the complexing agent and the uranium value after the stripping can be readily recovered in a marketable form by, for example, the method described by F. J. Hurst et al. in the above publication.

When hydrofluoric acid is employed as a complexing agent the predominant portion of uranium value stripped from the organic extractant precipitates out of the aqueous stripping solution in the form of hydrated uranium tetrafluoride, also called "green salt," having the formula $UF_4 \cdot xH_2O$. This uranium product may be easily recovered from the stripping solution after the stripping by settling and filtration.

In practicing this invention, the liquid-liquid contact should preferably be carried out in an organic-continuous mode, i.e., the aqueous base should be dispersed in the organic phase. The liquid-liquid extraction can be carried out using multi-stage countercurrent mixer-settler apparatuses, e.g. four, with the mixer operated in an organic continuous manner. Within each stripping stage, the aqous stripping solution is preferably continuously subjected to electrolytic reduction.

The temperature at which the uranium removal from the organic extractant is practiced is generally between 40 and 160° F. and preferably between 70 and 130° F.

A preferred embodiment of the invention involves contacting an organic solution containing 0.5 mole/liter of di(2-ethylhexyl) phosphoric acid and 0.125 mole/liter of trioctylphosphine oxide in kerosene as the solvent with an aqueous solution of phosphoric acid, at a concentration of about 55% $H_3PO_4$ by weight, and containing about 1% by weight of ferrous sulfate ($FeSO_4$) as the source of divalent iron. The uranium contained in the organic solution is, prior to a stripping operation, believed to be in an oxidation state of +6 at a concentration level between about 300 and about 1000 parts per million by weight, expressed as $U_3O_8$. During stripping, the uranium is believed to be reduced to the +4 oxidation state and transferred to the aqueous solution where it reaches a concentration between about 5,000 and about 15,000 parts per million by weight, again expressed as $U_3O_8$.

A principal advantage of our invention results from the fact that uranium removal from the organic extractant is accomplished without neutralization of the dialkylphosphoric acid dissolved in the organic extractant. Consequently, the disadvantages of prior art resulting from high ammonia consumption are avoided. In addition to reduced ammonium consumption costs, the contamination of phosphoric acid with ammonia is essentially eliminated. Furthermore, when phosphoric acid is employed as the complexing agent in the stripping solution, phosphoric acid losses are virtually eliminated, since the organic extractant is contacting aqueous phosphoric acid solutions throughout the entire extraction-stripping cycle.

BRIEF DESCRIPTION OF THE DRAWINGS

FIG. 2 schematically illustrates the mixer-settler apparatus used in Examples 1 and 2 set out below.

FIG. 3 schematically illustrates the "countercurrent uranium extraction circuit" and "countercurrent uranium stripping circuit" shown in FIG. 1.

Figure 1:
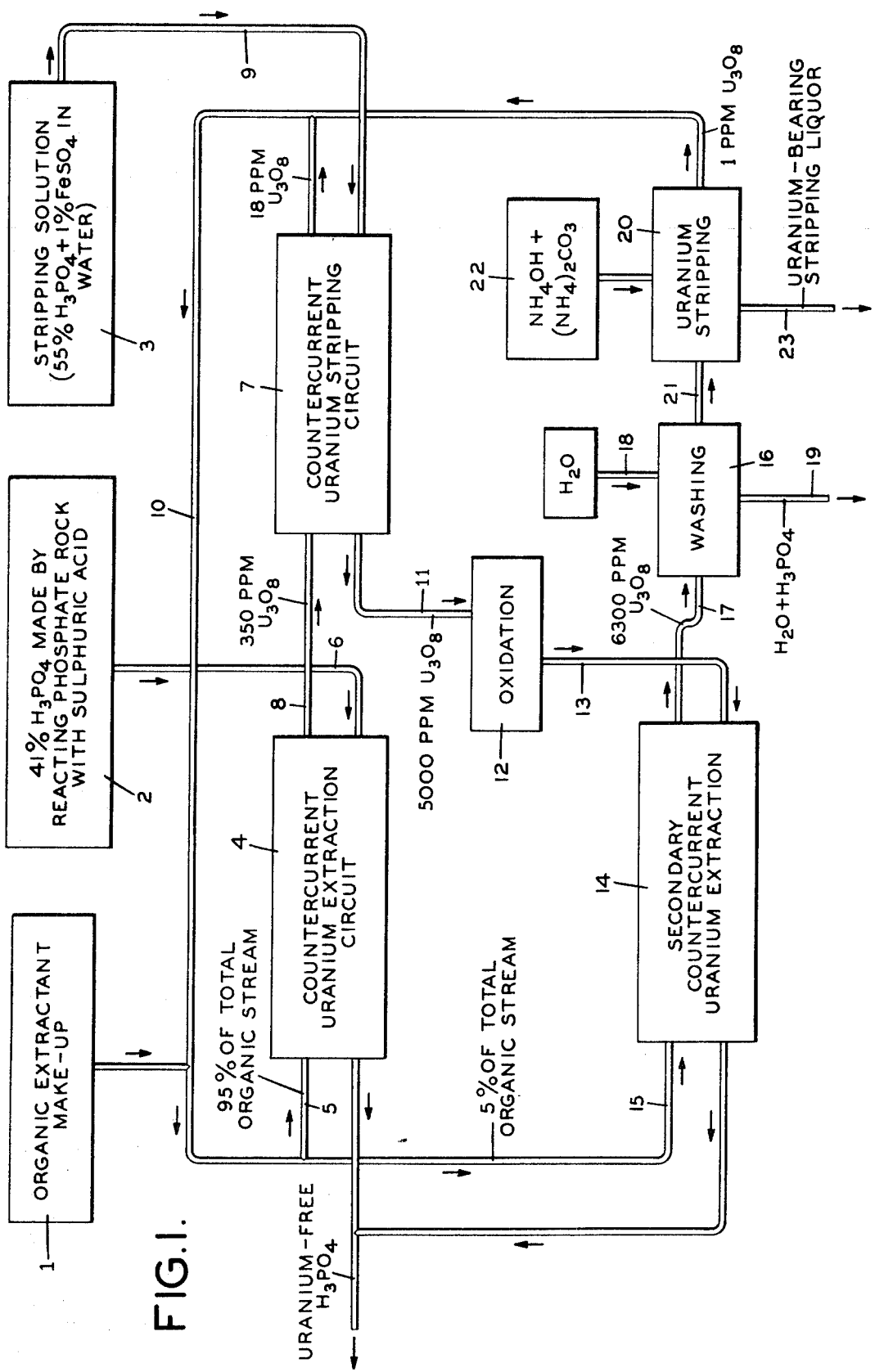
FIG. 1 schematically illustrates the uranium extraction for Example 4 set out below.

It is not intended that the process be restricted to what is shown in FIGS. 1, 2 and 3. Rather the drawings are merely for illustrative purposes.

Referring to FIG. 1, organic extractant makeup 1 is introduced into the countercurrent uranium extraction circuit 4 via inlet 5, while phosphoric acid 2 is introduced into 4 via line 6. Organic extractant rich in uranium, from circuit 4, is introduced into countercurrent uranium stripping circuit 7 via line 8, while stripping solution 3 is introduced into unit 7 via line 9. The stripped organic extractant from circuit 7 is returned to unit 4 via lines 5 and 10 and can either supplement or substitute for makeup 1. Aqueous uranium rich stripping solution from circuit 7 is introduced via line 11 into oxidation unit 12. Thereupon the uranium rich solution from oxidation unit 12 is introduced via line 13 into a secondary countercurrent uranium extraction unit 14. Additional organic extractant from sources 1 and/or 10 is introduced into unit 14 via inlet 15. Generally, substantially all of the organic extractant used in the countercurrent uranium extraction circuit 4 passes through the countercurrent uranium stripping circuit 7 and is then returned back to the countercurrent uranium extraction circuit 4, with organic extractant makeup added only to compensate for unavoidable losses in operation due to spillage, evaporation and the like.

Referring to FIG. 2, organic extractant phase containing about 350 p.p.m. $U_3O_8$ is introduced into mixer 24. An aqueous solution phase containing the hydrogen fluoride and ferrous sulfate is introduced into mixer 25. Contact of the two phases are made in mixers 24 and 25. The two phases settle out in settlers 26 and 27. Aqueous stripping solution carrying $UF_4$ is thereupon obtained from outlet 28, while stripped organic extractant with less than 1 p.p.m. $U_3O_8$ is obtained from outlet 29. Each mixer-settler unit of FIG. 2 represents one stage in the liquid-liquid extraction unit.

FIG. 3 shows a series of mixers 30, settlers 31 and electrolytic reduction units 32. Each of the mixer-settler units represents one stage of the countercurrent apparatus. Thus prior to the oxidation step of Example 4, there are four stages in the extraction circuit and four stages in the stripping circuit. The operation of the apparatus of FIG. 3, is analogous to operation of the apparatus of FIG. 2, differing only in that it involves a plurality of stages. The four-stage countercurrent mixer-settler apparatus of Example 3, below, is identical to the "countercurrent uranium stripping circuit" unit illustrated in FIG. 3.

The following examples are intended to illustrate the underlying principles of our process but with no intention to be limited thereto.

Example 1

A kerosene solution containing about 0.5 mole/liter of di(2-ethylhexyl) phosphoric acid, about 0.125 mole/liter of trioctylphosphineoxide and about 350 parts per million by weight of uranium, expressed as $U_3O_8$, was contacted with an aqueous solution containing about 25% by weight of hydrogen fluoride and about 10% by weight of ferrous sulfate. The liquid-liquid contact was carried out in a two-stage countercurrent mixer-settler apparatus as shown in FIG. 2. The uranium content of the organic extractant after the stripping operation was less than about 1 part per million by weight, expressed as $U_3O_8$. The predominant fraction of the uranium precipitated out of the aqueous stripping solution in the form of $UF_4 \cdot xH_2O$, a solid green material analyzing about 70% uranium, expressed as $U_3O_8$. The mixer-settler units in this example and the following examples were operated at about 100° F.

Example 2

A kerosene solution containing about 0.5 mole/liter of di(2-ethylhexyl) phosphoric acid, about 0.125 mole/liter of trioctylphosphine oxide and about 350 parts per million by weight of uranium, expressed as $U_3O_8$, was contacted with an aqueous solution containing about 15% by weight of hydrogen fluoride and about 1.0% by weight of ferrous sulfate. The liquid-liquid contact was carried out in a two-stage countercurrent mixer-settler apparatus as shown in FIG. 2. The uranium content of the organic extractant after the stripping operation was less than one part per million by weight, as $U_3O_8$. The predominant fraction of the uranium precipitated out of the aqueous stripping solution in the form of $UF_4 \cdot xH_2O$, a solid green material analyzing about 75% uranium, expressed as $U_3O_8$.

Example 3

A kerosene solution containing about 0.5 mole/liter of di(2-ethylhexyl) phosphoric acid, about 0.125 mole/liter of trioctylphosphine oxide and about 350 parts per million by weight of uranium, expressed as $U_3O_8$, was contacted with an aqueous solution containing, by weight, about 55% $H_3PO_4$ and about 1% $FeSO_4$. The liquid-liquid contact was carried out in a four-stage countercurrent mixer-settler apparatus which is identical to the "countercurrent uranium stripping circuit" unit of FIG. 3. The uranium concentration in the aqueous phase after stripping was about 5,000 parts per million by weight, while the stripped organic extractant contained about 18 p.p.m. $U_3O_8$ by weight. Within each stripping stage, the aqueous stripping solution was subjected to electrolytic reduction in order to maintain its iron content in the divalent oxidation state.

Example 4

As shown by FIGS. 1 and 3, the uranium value of phosphoric acid produced by acidulation of phosphate rock is removed from the phosphoric acid using a four-stage countercurrent uranium extraction circuit as part of the system.

After the extraction, the organic solution, containing 0.5 mole/liter of di(2-ethylhexyl) phosphoric acid and 0.125 mole/liter of trioctylphosphineoxide in kerosene, has a uranium concentration of 350 p.p.m., $U_3O_8$ by weight. This pregnant organic extractant is subjected to uranium stripping in accordance with the present invention as described in Example 3 in the "countercurrent uranium stripping circuit unit" shown in FIG. 3. The stripped organic extractant, containing 18 p.p.m. $U_3O_8$, is returned to the uranium extraction circuit via lines 5 and 10. The pregnant aqueous stripping solution containing about 5,000 parts per million by weight of $U_3O_8$ is subjected in unit 12 to oxidation at 100° F. and at atmospheric pressure with 10 grams of sodium chlorate per liter of solution. Uranium recovery from this solution is carried out utilizing a small side stream of the organic extractant, representing about 5% of the total organic flow. This involves the use of a secondary four-stage countercurrent uranium extraction circuit 14 referred to in FIG. 1, in which the organic extractant achieves a uranium concentration of about 6,300 parts per million $U_3O_8$ by weight. The pregnant organic phase is washed with water in unit 16 and stripped with ammonium hydroxide-ammonium carbonate in unit 20. Unit 20 was operated at about 80° F. and at atmospheric pressure. Upon steam stripping, a product containing about 90% by weight of uranium expressed as $U_3O_8$ precipitates from the ammonium hydroxide-ammonium carbonate stripping solution.

In the above operation, the majority of the iron winds up in the stream of acid leaving the "Secondary Countercurrent Uranium Extraction" unit, and enters the "Uranium-Free $H_3PO_4$" product stream shown in FIG. 1. However, some of the iron is transferred in the "Countercurrent Uranium Stripping Circuit," from the stripping solution into the organic stream, indicated as "18 p.p.m. $U_3O_8$" in FIG. 1, and thus finds its way back to the organic extractant input via line 10.

In an alternative embodiment, rather than to return the acid leaving the "Secondary Countercurrent Uranium Extraction" unit to mix with the product stream ("Uranium-Free $H_3PO_4$"), as shown in FIG. 1, this acid from the "Secondary Countercurrent Uranium Extraction" unit can be returned to source 3 of the "Stripping Solution," after having its iron content, in an eletrolytic reduction unit, adjusted and reduced from what is believed to be the ferric to the ferrous state.

An advantage of our process is readily apparent from Example 4. Thus since only 5% of the total organic extractant is subjected to ammonium hydroxide-ammonium carbonate stripping, the ammonia losses due to neutralization of the dialkylphosphoric acid are twenty-fold smaller in this overall process than they would be if this stripping technique had been applied to the entire organic extractant stream. Moreover, the subjection of the organic extractant to any ammonium hydroxide-ammonium carbonate stripping can be completely eliminated. In practice none of the organic extractant need to be subjected to ammonium hydroxide-ammonium carbonate stripping.

The expressions employed in the specification are used as terms of description and not of limitation. There is no intention, in the use of such expressions of excluding any equivalents of the features shown and described or portions thereof, and it should be recognized that various modifications are possible within the scope of the claimed invention. The apparatuses described for practicing our invention are not a part of it. Any apparatuses can be used that will achieve the desired results.

What is claimed is:

1. Process for obtaining uranium values from an extractant comprising a dialkylphosphoric acid and a trialkylphosphine oxide dissolved in a water immiscible organic solvent which comprises stripping the extractant with an aqueous phosphoric acid solution containing from about 40 to 85% by weight $H_3PO_4$ having dissolved therein a divalent iron salt.

2. Process according to claim 1 wherein the aqueous phase is oxidized after uranium stripping.

3. Process according to claim 1 where said phosphoric acid solution contains from about 40 to 55% $H_3PO_4$ by weight, and wherein said phosphoric acid solution contains dissolved therein from about 1 to 100 grams of divalent iron per liter of solution.

4. Process according to claim 3 wherein said divalent iron salt is ferrous sulfate.

5. Process for obtaining uranium values from an extractant comprising a dialkylphosphoric acid and a trialkylphosphine oxide dissolved in a water-immiscible organic solvent wherein said uranium values in said extractant are in a hexavalent oxidation state, which comprises stripping the extractant with a solution consisting essentially of aqueous phosphoric acid containing from about 40% to 85% by weight $H_3PO_4$ and having dissolved therein an amount of a divalent iron salt effective to cause said uranium values to pass from said extractant into said solution, said process further characterized in that the uranium values which pass into said solution remain dissolved in said solution.

6. Process for obtaining uranium values from an extractant comprising a dialkylphosphoric acid and a trialkylphosphine oxide dissolved in a water-immiscible organic solvent wherein said uranium values in said extractant are in a hexavalent oxidation state, which comprises stripping the extractant with a solution consisting essentially of aqueous phosphoric acid containing from about 40 to 85% by weight $H_3PO_4$ and having dissolved therein an amount of divalent iron salt effective to cause said uranium values to pass from said extractant into said solution, said process further characterized in that (a) effective stripping of the extractant is the result solely of the presence of the divalent iron salt in the stripping solution and (b) the uranium values which pass into said solution remain dissolved in said solution.

7. Process for obtaining uranium values from an extractant comprising a dialkylphosphoric acid and a trialkylphosphine oxide dissolved in a water-immiscible organic solvent which comprises stripping the extractant with an aqueous hydrofluoric acid solution having dissolved therein an amount of a divalent iron salt effective to cause said uranium values to pass from said extractant into said hydrofluoric acid solution, said process further characterized in that effective stripping of the extractant is the result solely of the presence of the divalent iron salt in the stripping soluion.

8. Process for obtaining uranium values from an extractant comprising a dialkylphosphoric acid and a trialkylphosphine oxide dissolved in a water-immiscible organic solvent which comprises stripping the extractant with an aqueous solution comprising a divalent iron salt and a complexing agent selected from the group consisting of phosphoric acid, hydrofluoric acid and mixtures thereof, said divalent iron being present in said solution in an amount effective to cause said uranium values to pass from said extractant into said solution, said process further characterized in that effective stripping of the extractant is the result solely of the presence of said divalent iron salt in the stripping solution.

References Cited

UNITED STATES PATENTS

| | | | |
|---|---|---|---|
| 2,859,094 | 11/1958 | Schmitt et al. | 23—341 |
| 2,860,031 | 11/1958 | Grinstead | 23—341 |
| 2,937,925 | 5/1960 | Blake et al. | 23—341 |
| 3,243,257 | 3/1966 | Coleman | 23—341 |
| 2,882,123 | 4/1959 | Long | 23—341 X |
| 2,849,286 | 8/1958 | Welt et al. | 23—341 X |

CARL D. QUARFORTH, Primary Examiner

R. L. TATE, Assistant Examiner

U.S. Cl. X.R.

423—11

PO-1050
(5/69)

UNITED STATES PATENT OFFICE
CERTIFICATE OF CORRECTION

Patent No.     3,737,513     Dated     June 5, 1973

Inventor(s)     T. K. Wiewiorowski and D. J. Miller

It is certified that error appears in the above-identified patent and that said Letters Patent are hereby corrected as shown below:

Column 1, line 46,     "West" should be -- Wet --;

Column 1, line 66,     "Hunt" should be -- Hurst --;

Column 3, line 11,     "effectivness" should be -- effectiveness --;

Signed and sealed this 19th day of February 1974.

(SEAL)
Attest:

EDWARD M. FLETCHER, JR.
Attesting Officer

C. MARSHALL DANN
Commissioner of Patents

Notice of Adverse Decision in Interference

In Interference No. 101,079, involving Patent No. 3,737,513, T. K. Wiewiorowski and D. J. Miller, RECOVERY OF URANIUM FROM AN ORGANIC EXTRACTANT BY BACK EXTRACTION WITH $H_3PO_4$ OR HF, final judgment adverse to the patentees was rendered Jan. 27, 1984, as to claims 2 and 3.

[*Official Gazette March 13, 1984.*]